Feb. 2, 1926.  
C. R. LANUS  
ATTACHMENT FOR TRACTION WHEELS  
Filed Nov. 14, 1923  
1,571,419
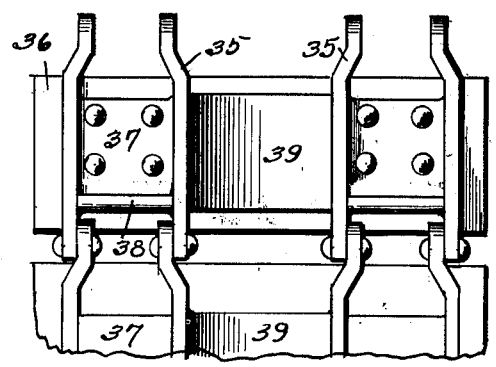
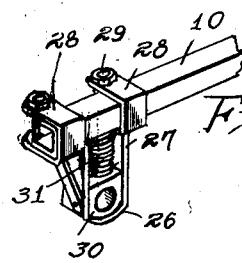
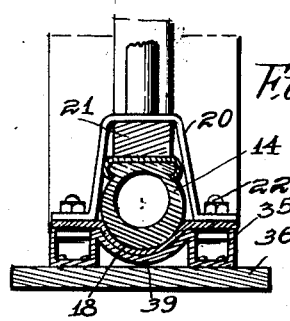
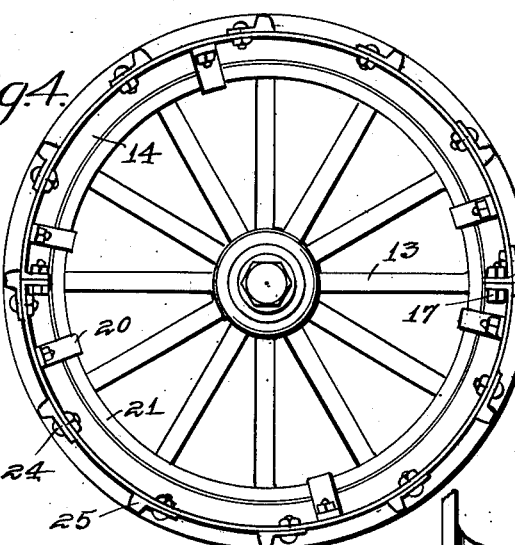
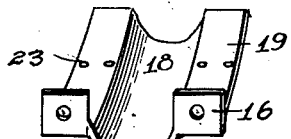
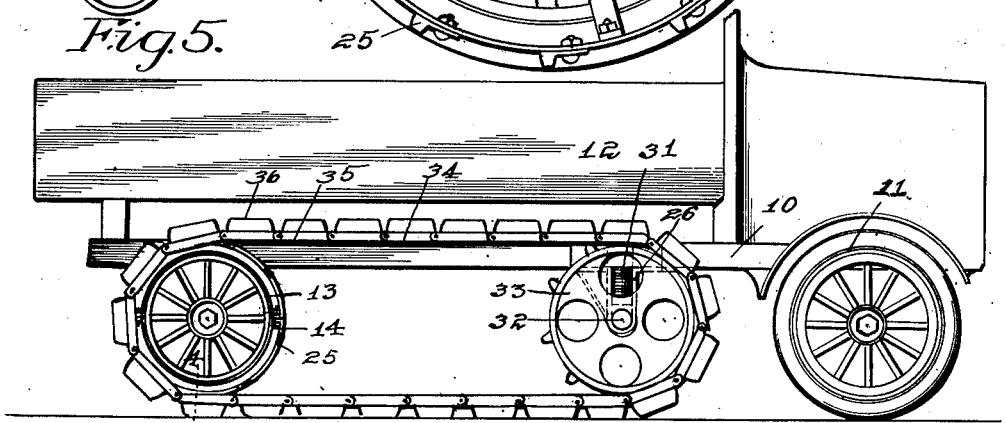

Patented Feb. 2, 1926.

1,571,419

UNITED STATES PATENT OFFICE.

CHARLES R. LANUS, OF POCAHONTAS, IOWA.

ATTACHMENT FOR TRACTION WHEELS.

Application filed November 14, 1923. Serial No. 674,605.

*To all whom it may concern:*

Be it known that I, CHARLES R. LANUS, a citizen of the United States, and a resident of Pocahontas, in the county of Pocahontas and State of Iowa, have invented a certain new and useful Attachment for Traction Wheels, of which the following is a specification.

The object of my invention is to provide means of simple, durable and inexpensive construction which may be easily and quickly applied to the tread of a traction wheel, such as commonly used on automobiles or trucks, for the purpose of increasing the traction between the tread of said wheels and the ground surface.

A further object is to provide means to be used in connection with the above mentioned device whereby an ordinary truck may be provided with what is commonly known as a linked tread, said device being so arranged that it may be easily and quickly attached or detached without altering the frame of the truck.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a wheel of a self-propelled vehicle showing the manner in which my improved traction member is applied thereto.

Figure 2 is a side elevation of a truck showing my improved linked tread applied thereto.

Figure 3 is an enlarged detail view showing in plan a segmental portion of the linked tread member.

Figure 4 is an enlarged detail sectional view taken on the line 4—4 of Figure 2.

Figure 5 is a detail perspective view of a segmental portion of the detachable traction member.

Figure 6 is a detail perspective view showing a portion of the truck frame and the manner in which the axle supporting bracket for my linked tread device is applied thereto.

Figure 7 is an end elevation of the same.

The numeral 10 indicates a frame of a truck such as is in common use and 11 the front wheels, 12 the body and 13 the rear wheels, which may be of the type that employs either solid or pneumatic tires. The drawings herewith show that type which employs a pneumatic tire, designated by the numeral 14.

For the purpose of converting the truck 10 into a tractor, I have provided on each of the rear wheels 13 an auxiliary tread member which I shall term a traction member 15. The said member 15 is formed of two semi-annular pieces which have their adjacent ends provided with inwardly extending flanges 16, said flanges being secured together by means of bolts 17. Each of the said semi-annular members is formed of heavy sheet metal and provided with a longitudinally and centrally located groove 18, said groove being formed by pressing the sheet metal of which the semi-annular members are constructed into such shape that they will conform with the outer tread portion of the tire 14, as clearly shown in Figure 4.

The said semi-annular members are so shaped that laterally extending flanges 19 are formed. The flange members 16 are formed at each end of the members 19, as clearly shown in Figure 5. The traction members 15 are further secured in position by means of straps 20 which extend over the felly 21 and bolted to the inner surface of the members 19, as clearly shown in Figure 4, by means of bolts 22. The members 20 serve the double function of helping to support the traction member in position against lateral movement and to secure the traction member against longitudinal movement.

It will be seen that the flanges 19 serve the purpose of preventing the wheel 13 from sinking in soft ground. Each of the flanges 19 is provided with a series of openings 23 for the purpose of receiving bolts 24, by which suitable lugs 25 may be secured thereto. The said lugs may be of any desired height. I have found for ordinary work that if the lugs are of such height that their outer surfaces come even with the outer surface of the tread portion formed by the groove 18, that the wheel may be rotated over hard surfaces without a tendency of raising and lowering the wheel each time one of the lugs engages the ground surface. These lugs may also be used for the purpose of engaging the linked tread members hereinafter to be described.

It will be seen that higher lugs may be substituted for the ones shown in the drawings, such as sometimes used on the ordinary tractors, if so desired. The tread members just described I find make a practical attachment which may be applied to the wheel of a truck for the purpose of converting it into a tractor, and is sufficient for ordinary purposes.

Sometimes it is desirable in soft and muddy ground to use what is commonly known as a linked tread. I have provided a bracket 26 secured to each of the main frame members of the truck in the manner shown in Figures 6 and 7. This bracket comprises substantially a U-shaped member 27 having the free end of each of its members provided with a clamp 28 designed to surround the frame member and to be rigidly secured in position by means of bolts 29 in the manner clearly illustrated.

The members 27 are provided with a boxing 30 slidably mounted therein in such a manner that it is capable of up and down movement, the boxing being yieldably held to its lower limit of movement by means of a spring 31. The brackets 26 are placed on the frame of the truck at a point between the front and back wheels and are designed to receive a transversely arranged shaft 32, each end of which is provided with a sprocket wheel 33, which may be of substantially the same diameter as the wheel 13 or smaller if so desired.

Mounted over one of the wheels 13 and the corresponding one of the sprockets 33 I provide a tread member 34 which comprises a series of links 35 pivoted together and tread blocks 36. The links 35 are formed double as shown in Figure 3, the said links being connected by a plate 37 and an upwardly projecting rib 38. The tread comprises two sets of these double links arranged parallel and connected by a circular plate 39 which has the same curvature as the outer face of the member 18, and so arranged that the outer face of the member 18 will travel over the face of the curved portion 39.

The links 35 extend outwardly from the blocks 36 and are designed to be engaged by the flanges 19, as clearly shown in Figure 4. This provides means whereby the tractor member 15 will make positive engagement with the tread member 34. The lugs 25 of the member 15 are designed to engage the members 38 in the same manner as the teeth of a sprocket wheel engage the sprocket chain.

Thus it will be seen that by providing the detachable tractor member 15 I have provided means where the truck may be easily and quickly converted into a tractor of either the regular or linked tread type, to thereby provide means whereby at a slight expense the operator may utilize his truck for a comparatively large number of purposes. By providing the tractor 15 with the rounded portion 18 I have provided means whereby the truck may be operated at comparatively high speed over paving or hard roads, and by providing suitable lugs the truck may be utilized in soft and muddy ground.

I claim as my invention:

1. In combination, a pair of semi-annular traction members, each formed with an outwardly extending circumferential rib, the edges of said ribs terminating in laterally extending annular flanges, means for detachably securing the adjacent ends of said annular members together, a series of lugs for the laterally extending annular flanges, a linked tread member formed of a series of tread blocks, each provided with a curved plate designed to fit and receive the outer surface of said annular rib, each edge of said curved plate being provided with a link for connecting said tread blocks together, the upper edge of said links being designed to engage the outer surface of said laterally extending annular flanges, each of said links being provided with a laterally extending rib to engage the lugs of said laterally extending annular member.

2. A traction device comprising an annular tread member and a linked tread member, the annular tread member having a centrally and outwardly extending circumferential rib, the linked tread member being formed of a series of tread blocks, each of which is provided with links connecting said blocks together, the links being arranged to carry and support the said annular tread member with the rib portion extending downwardly between two of said links to form means for guiding the linked tread member relative to the annular tread member.

3. A traction device comprising an annular tread member and a linked tread member, the annular tread member having a centrally and outwardly extending circumferential rib, the linked tread member being formed of a series of tread blocks, each of which is provided with links connecting said blocks together, the links being arranged to carry and support the said annular tread member with the rib portion extending downwardly between two of said links to form means for guiding the linked tread member relative to the annular tread member, said annular tread member being provided with a series of lugs, and said linked tread member being provided with lugs to coact with the first said lugs.

4. In a device of the class described, a tread block, one surface of which is provided with a concaved plate, the upper edges of which terminate in link members, the lower and outer edge of each of said link members being provided with a laterally extending plate, the outer edge of each of said plates terminating in a link member parallel with the first said link member, each of the last said link members connecting the adjacent first said link members by means of an upwardly extending rib.

5. In combination, a tread block, one surface of which is provided with a concaved plate, the upper edges of which terminate in link members, the lower and outer edge of each of said link members being provided with a laterally extending plate, the outer edge of each of said plates terminating in a link member parallel with the first said link member, each of the last said link members connecting the adjacent first said link members by means of an upwardly extending rib, an annular tread member having a central circumferential rib curved to fit the concaved surface of said plate with the said annular members engaging the upper surface of said links, said annular members being provided with lugs to coact with the upwardly extending ribs connecting said links.

Des Moines, Iowa, September 17, 1923.

CHARLES R. LANUS.